US009210207B2

(12) United States Patent
Reynolds et al.

(10) Patent No.: US 9,210,207 B2
(45) Date of Patent: Dec. 8, 2015

(54) TIME-SENSITIVE CONTENT MANIPULATION IN ADAPTIVE STREAMING BUFFER

(71) Applicant: ERICSSON TELEVISION INC., Duluth, GA (US)

(72) Inventors: Jennifer Ann Reynolds, Duluth, GA (US); Charles Hammett Dasher, Lawrenceville, GA (US)

(73) Assignee: ERICSSON AB, Stockholm (SE)

( * ) Notice: Subject to any disclaimer, the term of this patent is extended or adjusted under 35 U.S.C. 154(b) by 135 days.

(21) Appl. No.: 14/179,876

(22) Filed: Feb. 13, 2014

(65) Prior Publication Data

US 2015/0229694 A1     Aug. 13, 2015

(51) Int. Cl.
| | | |
|---|---|---|
| *G06F 15/16* | (2006.01) | |
| *H04L 29/06* | (2006.01) | |
| *H04L 29/08* | (2006.01) | |
| *G06Q 30/02* | (2012.01) | |
| *H04N 21/45* | (2011.01) | |
| *H04N 21/462* | (2011.01) | |
| *H04N 21/61* | (2011.01) | |
| *H04N 21/81* | (2011.01) | |

(52) U.S. Cl.
CPC .......... *H04L 65/604* (2013.01); *G06Q 30/0261* (2013.01); *G06Q 30/0267* (2013.01); *G06Q 30/0271* (2013.01); *H04L 67/2842* (2013.01); *H04N 21/4524* (2013.01); *H04N 21/4622* (2013.01); *H04N 21/6125* (2013.01); *H04N 21/812* (2013.01)

(58) Field of Classification Search
CPC ............ H04L 65/604; H04L 67/2842; G06Q 30/0261; G06Q 30/0271; G06Q 30/0267; H04N 21/4524; H04N 21/4622; H04N 21/6125; H04N 21/812
USPC .................................................. 709/203, 231
See application file for complete search history.

(56) References Cited

U.S. PATENT DOCUMENTS

| | | | |
|---|---|---|---|
| 8,386,630 | B1 * | 2/2013 | Atzmon ........................ 709/231 |
| 8,984,094 | B2 * | 3/2015 | Green et al. .................. 709/217 |
| 2008/0281711 | A1 | 11/2008 | Bridges et al. |
| 2011/0167486 | A1 | 7/2011 | Ayloo et al. |
| 2011/0307545 | A1 * | 12/2011 | Bouazizi ...................... 709/203 |
| 2012/0047542 | A1 | 2/2012 | Lewis et al. |
| 2012/0179788 | A1 * | 7/2012 | McGowan .................... 709/219 |
| 2013/0246643 | A1 * | 9/2013 | Luby et al. .................... 709/231 |
| 2013/0263180 | A1 | 10/2013 | Yang et al. |
| 2014/0068648 | A1 * | 3/2014 | Green et al. ..................... 725/18 |
| 2015/0163273 | A1 * | 6/2015 | Radcliffe et al. ............. 709/231 |
| 2015/0229694 | A1 * | 8/2015 | Reynolds et al. ............. 709/219 |

* cited by examiner

*Primary Examiner* — Michael Y Won (57) ABSTRACT

A client device streams content from a streaming server via a buffer, with the content containing segments of requested content and segments of time-sensitive content (TSC). The client device scans metadata associated with the buffer to determine whether an instance of TSC in the buffer is optimal. Responsive to determining that a given instance of TSC in the buffer is not optimal, replacing the given instance of TSC with a replacement instance of TSC stored on the client device.

18 Claims, 4 Drawing Sheets

TIME-SENSITIVE CONTENT MANIPULATION IN ADAPTIVE STREAMING BUFFER

FIELD OF THE DISCLOSURE

The present disclosure generally relates to manipulation of time-sensitive content in the buffer of a streaming client. More particularly, and not by way of any limitation, the present disclosure is directed to replacing time-sensitive content in the buffer that is no longer relevant.

BACKGROUND

There is a growing trend in the field of streaming media to provide time-sensitive content (TSC), such as advertising or public service announcements, that is targeted to a user's current, real-time activities. For example, services such as "Groupon Now" show users soon-to-expire deals and advertisements for businesses around the users. In an environment in which users may change locations while streaming media or may pause the streaming media for an extended period, simply placing a time-sensitive advertisement into an adaptive stream buffer offers no guarantee that the user will see the information in a reasonable time period. As such, adaptive streaming video servers have no means of assuring that time sensitive content is relevant when the user actually views the streaming media.

SUMMARY

The present patent disclosure is broadly directed to a method performed on a client device. The method streams content from a streaming server via a buffer, the content comprising segments of requested content and segments of time-sensitive content (TSC). The method scans metadata associated with the buffer to determine whether an instance of TSC in the buffer is optimal; and responsive to determining that a given instance of TSC in the buffer is not optimal, replaces the given instance of TSC with a replacement instance of TSC stored on the client device.

In another aspect, an embodiment of a client device includes a processor operably coupled to a memory subsystem and to an interface configured to receive streaming content. The client device further includes a streaming client configured to stream content from a remote server via a buffer and time-sensitive content (TSC) manipulation logic configured to scan metadata associated with the buffer to determine whether an instance of TSC in the buffer is optimal. Responsive to determining that a given instance of TSC in the buffer is not optimal, the TSC manipulation logic is configured to replace the given instance of TSC with a replacement instance of TSC stored on the client device.

In a still further aspect, an embodiment of a non-transitory computer-readable medium contains instructions stored thereon which, when executed by a client device operable to stream content, perform the acts of: streaming content from a streaming server via a buffer, the content comprising segments of requested content and segments of time-sensitive content (TSC); scanning metadata associated with the buffer to determine whether an instance of TSC in the buffer is optimal; and responsive to determining that a given instance of TSC in the buffer is not optimal; replacing the given instance of TSC with a replacement instance of TSC stored on the client device.

As will be explained in further detail hereinbelow, one or more of the embodiments of the present disclosure aim to address at least some of the concerns set forth in the foregoing background section, inter alia. For instance, one or more embodiments of the present disclosure may beneficially replace time-sensitive content when the TSC is no longer relevant or more relevant TSC is available. Various additional benefits and advantages will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

In the following description, numerous specific details are set forth with respect to one or more embodiments of the present patent disclosure. However, it should be understood that one or more embodiments may be practiced without such specific details. In other instances, well-known subsystems, components, structures and techniques have not been shown in detail in order not to obscure the understanding of the example embodiments. Accordingly, it will be appreciated by one skilled in the art that the embodiments of the present disclosure may be practiced without such specific details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element or node may be comprised of one or more pieces of service network equipment, including hardware and software that communicatively interconnects other equipment on a network (e.g., other network elements, end stations, etc.), and is adapted to host one or more applications or services with respect to a plurality of subscribers. Some network elements may comprise "multiple services network elements" that provide support for multiple networking functions, in addition to providing support for multiple application services. Subscriber end stations (e.g., set-top boxes, workstations, laptops, netbooks, palm tops, mobile phones, smartphones, multimedia phones, portable media players, etc.) may access or consume content/services provided over broadcast networks (e.g., cable networks) as well as a packet-switched wide area public network such as the Internet via suitable service provider access networks.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a network element, a subscriber device or end station, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such electronic devices may typically include a set of one or more processors coupled to one or more other components, such as one or more storage devices (non-transitory machine-readable storage media), user input/output devices (e.g., a keyboard, a touch screen, a pointing device, and/or a display), and network connections. Thus, the storage device or component of a given electronic device may be configured to store code and/or data for execution on one or more processors of that electronic device for purposes of implementing one or more techniques of the present disclosure.

Figure 1:
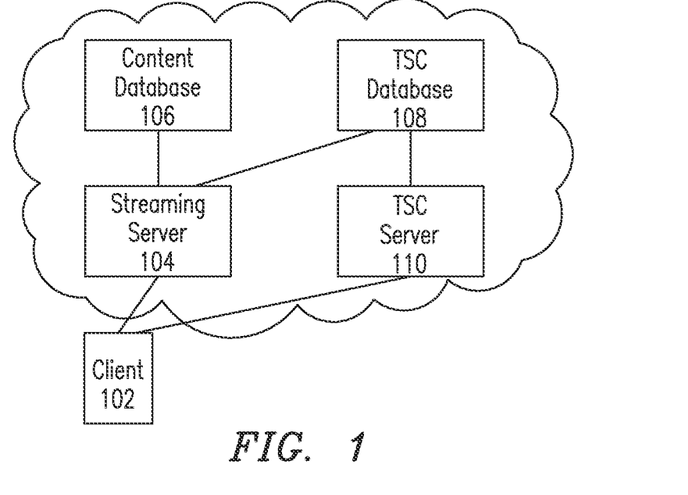
FIG. 1 depicts a network environment that provides streaming content to a client device according to an embodiment of the present patent application.

Referring now to the drawings and more particularly to FIG. 1, depicted therein is an example network environment that provides streaming content, including time-sensitive content (TSC) to client 102. For the purposes of this patent application, TSC is defined broadly as that content that is added by the network or other service provider. TSC can include advertising and public service announcements, but is not limited to these examples. This added content can be "time sensitive" to varying degrees. For example, an advertisement for a cheese burger from a specific fast food chain may be appropriate over a long period of time, while an advertisement for that cheese burger at a specific sale price may be appropriate only during a limited time period. Conversely, the more generic cheese burger advertisement may be considered highly relevant if the client is near a location associated with the fast food chain at noon or late at night. Client 102 can be connected to streaming server 104 using a wired or wireless connection via a shared network, such as the Internet, and utilizes adaptive bitrate (ABR) technology to receive streaming video from streaming server 104. In ABR technology, the video content is segmented into short clips that generally range between two and ten seconds in length; each segment can be encoded at a variety of bitrates. A manifest containing pointers to the location of each of the segments and bitrates is prepared and provided to client 102. The manifest can also contain other metadata related to the streaming content. For example, it is common to include an indication whether the associated content is requested content, e.g., a movie or other video requested by the user, or content inserted by the service provider, i.e., TSC. Client 102 can start requesting video segments from streaming server 104 at the lowest available bitrate, then as the buffer begins to fill, the client is able to adjust the requested bitrate in order to provide the highest bitrate that it is able to receive in the current network environment. If the buffer is filling up at a faster rate than necessary, client 102 can request a higher bitrate to improve the quality of video; conversely, if the buffer is emptying too quickly, client 102 requests segments at a lower bitrate to prevent a buffer underrun. In order to individualize the TSC, demographic information regarding the user may be collected by either a network entity associated with streaming server 104 or by client 102. In at least one embodiment, streaming server 104 determines the TSC that will be presented to the user at the time the content is request; pointers to the selected TSC are included in the manifest sent to client 102. In this manner, as client 102 requests segments using the manifest, the selected TSC are delivered at the appropriate time. In at least one alternate embodiment, the manifest provided to client 102 does not point to specific TSC, but instead includes indicators that provide locations and timings where TSC should be presented. In this embodiment, client 102 detects the indicators and inserts selected TSC directly into the segmented stream that is stored in the buffer. In this embodiment, the TSC inserted by the client can be received independently from the streamed content as discussed in greater detail below. Whether the TSC is determined by streaming server 104 or client 102, once the TSC is in the buffer, there has previously been no mechanism by which the presentation of this TSC can be changed. While such a procedure is not generally an issue, i.e., because most videos are watched from beginning to end at the time they are requested, changing patterns of use can bring up new issues.

One issue that can affect the relevance of TSC in the buffer is the size of buffer that is maintained at the client. Many clients maintain fairly small buffers, e.g. ten to thirty seconds of video, although applications are being suggested that utilized 30 minutes to an hour of buffering and more is possible in the future. Since the size of the buffer that is maintained by a client device is under the control of the client, a provider trying to provide up-to-the-minute advertising, for example, currently has no method to ensure that the advertisement or other TSC that is provided to the client will still be relevant when the video is watched. This problem can be further exacerbated by the circumstances encountered by the user, such as pausing a streaming video for an extended period when interrupted. In this situation, an instance of TSC that has an expiration time, e.g., today only, may have passed its expiration date or time before the TSC is viewed. Similarly, users are watching streaming video on more mobile devices. An instance of TSC that alerts the user to a bargain at a nearby location may no longer be relevant if the user has moved to a new location before the TSC can be presented. The disclosed method, device and computer program provide a means to better manage this issue.

As seen in FIG. 1, streaming server 104 is connected to content database 106 and to TSC database 108 and uses these databases to provide content, both requested content and TSC. Content database 106 contains programming content, such as movies, news programs, television shows or other video content that is made available. For the purposes of this patent application, content database 106 can also represent live streaming of content over a network. TSC database 108 contains content that is considered time-sensitive, such as advertisements, public service announcements, etc. Although streaming server 104 can provide TSC to client 102 at the time content is delivered, client 102 is now able to replace any TSC that become irrelevant between the time it is stored in the buffer and the time the content is played from the buffer. The replacement TSC can be provided to client 102 by TSC server 110, which is coupled to TSC database 108. Client 102 is able to contact TSC server 110 when the client is opened for the first time, in order to receive currently available TSC. Client 102 can also contact TSC server 110 as necessary to ensure that the available TSC are currently relevant to the user. It should be understood that although content database 106 and TSC database 108 are shown as separate databases, both types of content can be provided in a single database that provides the function of both of these databases.

In order for the disclosed methods to work efficiently, metadata that accompanies any instance of TSC will preferably carry indicators that convey the particular sensitivities associated with the specific instance. For example, any expiration date or time should be indicated. If the TSC should only be shown at specific times of day or when the user is within a given distance of a destination, this should be clearly indicated. Although date and location can be common limitations for presentation of any TSC, the possibilities of what makes TSC relevant is limited only by the provider's imagination. Weather-related advertising, e.g., for umbrellas, could be played when the user is in a location where rain is either falling or expected. Advertising for a restaurant can be provided based on time of day and location of the client device.

Figure 2A:
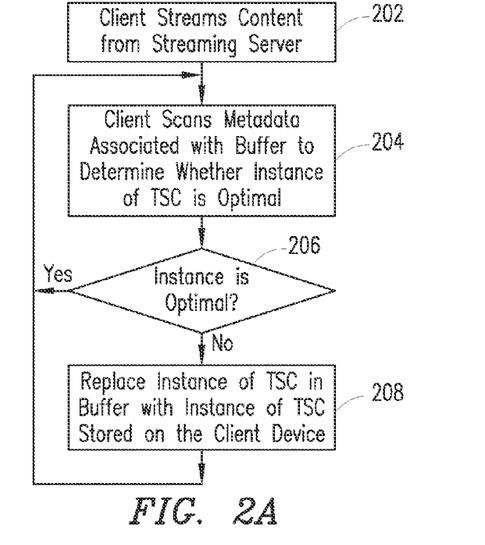
FIG. 2A depicts a flowchart of a method of replacing an instance of TSC that is not optimal according to an embodiment of the present patent disclosure.

Turning to the flowcharts, FIGS. 2A through 2G each provide portions of the disclosed method of manipulating time-sensitive content. With reference first to FIG. 2A, a client such as client 102 streams (202) content from a streaming server, such as streaming server 104, and places the received programming content and TSC into a buffer until the content can be presented to the user. The client scans (204) metadata associated with the buffer to determine whether an instance of TSC is optimal. For the purposes of this patent application, an optimal TSC is defined as having the highest priority of available TSC. The priority of an instance of TSC can be explicitly defined in the metadata or can be determined by the client based on conditions defined by the metadata and whether or not those conditions are met at the present time. Two example situations that can cause an instance of TSC to be replaced follow. In the first situation, an instance of TSC includes an advertisement for a sale that was valid when placed in the buffer, but which has since expired. In a second situation, an instance of TSC stored on the client device has a very high priority, while the buffer contains TSC of normal priority. This can occur when the client receives new, high priority TSC, e.g., for a sale that just started, directly from a server (discussed below) or when the proximity of the client device to a store associated with an instance of TSC increases the priority of that instance of TSC. In each of these situations, it would be beneficial to be able to replace the TSC currently in the buffer with a more optimal TSC. An instance of TSC can be considered to have an "average" priority when no special conditions cause the priority to be either raised or lowered. In at least one embodiment, an instance of TSC in the buffer would not be replaced unless an instance of TSC having a higher priority is present on the client device. In order to determine the TSC having the highest priority, the client will monitor the current conditions of the client device. In at least one embodiment, the location of the client can be determined using a global positioning system (GPS) that is associated with the client device, such as a cell phone, tablet or laptop computer. Alternatively, location can be derived from information collected by the client or by a network to which the client is attached. Similarly, date and time can be derived at least from a clock resident on the client device or from broadcast date and time information. In at least one embodiment, additional information can be provided, either from sensors on the client device or via a connection to a server, such as advertising server 110. The additional information can include information derived from the user's location, e.g., the weather, or services that are available near the user's location. The additional information can also include demographic information collected regarding the user or information that is derived from the user's web browsing or purchase history. Continuing to refer to FIG. 2A, if the client determines that the instance of TSC in the buffer is optimal ("yes" to 206), no changes to the buffer are made and scanning continues. If, however, the client determines that the instance of TSC is not optimal ("no" to 206), the instance of TSC in the buffer is replaced (208) with an instance of TSC stored on the client device. In the first situation above, the TSC for a sale that has expired would be replaced by other available TSC; and in the second situation, the high-priority TSC would be presented instead of the instance of TSC in the buffer that has a normal priority.

Figure 2B:
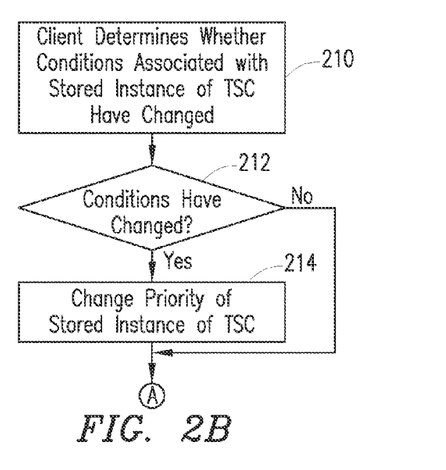
FIG. 2B depicts a flowchart of a method of determining the priority of an instance of TSC according to an embodiment of the present patent disclosure.

An object of the disclosed method is to provide optimal TSC to the user, so the client must not only be able to ascertain a priority for the TSC in the buffer, but must also be able to update a priority for any replacement TSC stored on the client device, as shown in FIG. 2B. As noted above, unless otherwise designated, most TSC will initially have a normal priority. The client then determines (210) whether the conditions associated with a stored instance of TSC have changed, e.g., has the time associated with the TSC started or ended or has proximity to a location changed. If the client determines that the conditions have changed ("Yes" to 212), the priority of the stored instance of TSC is changed (214) in an appropriate manner. If the client determines that the conditions associated with the stored instance of TSC have not changed ("No" to 212), the priority remains the same. Whether or not the priority has changed, the method then moves to FIG. 2C, where a further determination is made. In addition, although not specifically shown, other stored instances of TSC will also be monitored to determine whether conditions associated with these TSC have changed.

Figure 2C:
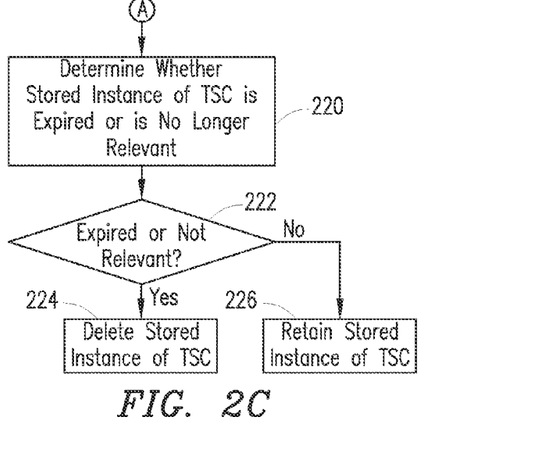
FIG. 2C depicts a flowchart of a method of deleting TSC that are no long relevant according to an embodiment of the present patent disclosure.
Figure 2D:
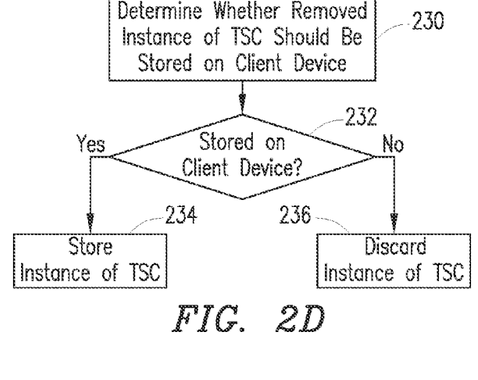
FIG. 2D depicts a flowchart of a method of determining how to handle a removed instance of a TSC according to an embodiment of the present patent disclosure.

In FIG. 2C, the client determines (220) whether the stored instance of TSC has expired or is no longer relevant. Current relevance can be affected by numerous conditions of the client device. For example, if a client device received TSC associated with a local restaurant while travelling, the client may determine that the user is unlikely to be near the associated restaurant when the trip is concluded, causing the instance of TSC to be no longer relevant. If the client determines that the stored instance of TSC has expired or is no longer relevant ("Yes" to 222), the stored instance of TSC is deleted (224) from the client device; otherwise, the stored instance of TSC is retained (226) on the client device for use at another time. When an instance of TSC is removed from the buffer, e.g., at element 208, a similar question can be asked with regard to the removed instance of TSC; this determination is shown in FIG. 2D. The client determines (230) whether the removed instance of TSC should be stored on the client device for later use. To answer this question, the client again looks to the metadata associated with the removed instance of TSC for information about an expiration date or circumstances for use of that instance of TSC. If the client determines that the removed instance of TSC should be stored on the client device ("Yes" to 232), the instance of TSC is stored on the client device; otherwise, the removed instance of TSC is discarded.

Figure 2E:
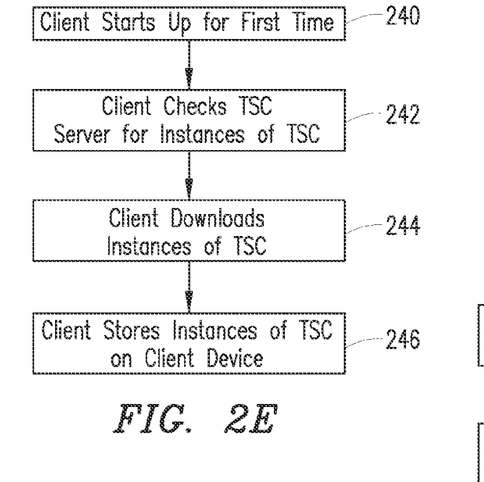
FIG. 2E depicts a flowchart of a method of initializing a client for replacement of TSC according to an embodiment of the present patent disclosure.
Figure 2F:
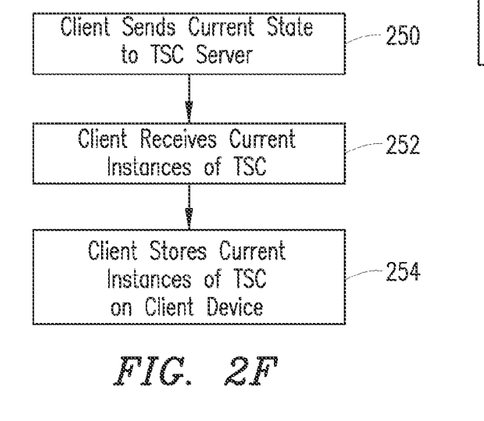
FIG. 2F depicts a flowchart of a method of updating stored TSC according to an embodiment of the present patent disclosure.
Figure 2G:
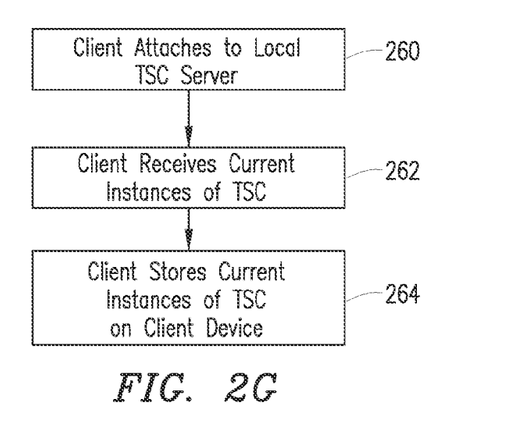
FIG. 2G depicts a flowchart of a method of receiving TSC from a local TSC server according to an embodiment of the present patent disclosure.

As noted earlier, in order to maintain a collection of TSC that can be utilized to replace instances of TSC in the buffer that are no longer relevant, client 102 has the ability to directly contact a TSC server, such as TSC server 110. FIGS. 2E-2G illustrate methods for providing and maintaining the necessary collection of TSC instances on the client device. As shown in FIG. 2E, when the client starts up (240) for the first time, the client checks (242) TSC server 110 for instances of TSC. Client 102 can share information regarding its location with TSC server 110, as well as demographic and other information that can be utilized to make TSC more relevant to the user. The client is then able to download (244) instances of TSC that are determined to be most relevant to the user. The client then stores (246) these instances of TSC on the client device, where they are available at any time. The collection of TSC can also be updated periodically, as shown in FIG. 2F. Depending on the specific implementation of the disclosed system, these updates can be scheduled to occur at regular intervals, e.g., weekly, or to be triggered by specific events, such as the user beginning to stream a video. When an update is to be initiated, client 102 sends (250) a current state of the client device to TSC server 110. The current state can include at least a location for the client device and may contain any other available information. The client then receives (252) current instances of TSC from TSC server 110. The client will store (254) the current instances of TSC on the client device. Although not specifically shown, it will be understood that client 102 can, at the time it receives new instances of TSC from server 110, also check previous instances of TSC stored on the client device to ensure that all TSC stored on the device are still relevant in at least some conditions.

Figure 3:
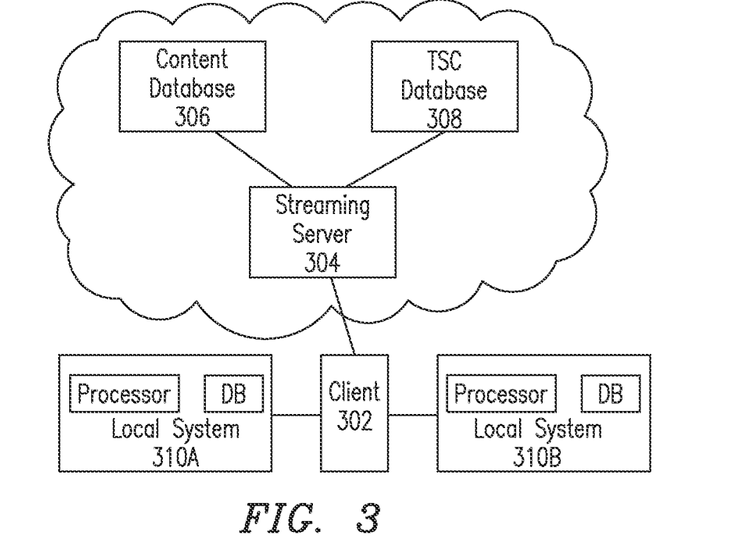
FIG. 3 depicts a network environment that provides streaming content to a client device according to an embodiment of the present patent application.

Up to this point, all references to a TSC server have discussed the centralized server shown in FIG. 1, which is generally available to clients who are connected to a packet data network. FIG. 3 illustrates another source for instances of TSC that can be provided locally. In this embodiment, client 302 will receive streaming video from streaming server 304 in a manner similar to that illustrated in FIG. 1. Streaming server 304 can still provide content from content database 306 and TSC from TSC database 308. However, in this embodiment, client 302 can also receive TSC from local systems 310A, 310B to which the client is able to attach. Each of local system 310A and 310B contain a processor and database and has a radio interface via which the local system can interact with clients, such as client 302. In one embodiment, this radio interface is a local area network (LAN) that clients can attach to when in the local area. In at least one embodiment, local systems 310 are provided as a service to area businesses. The local system 310 contains instances of TSC that can be provided to clients operating in the local area. In this manner, the business is able to provide TSC that can be presented to a user who is known to be in or near to the business. In at least one embodiment, TSC provided by local system 310A, 310B can be used to replace TSC in the buffer, even if the TSC already existing in the buffer is still relevant. That is, TSC received via a local system may be given a high priority over other TSC because of the geographic nearness of the client to the source of the TSC. FIG. 2G discloses the interaction between client 302 and local systems 310. Client 302 attaches to (260) local TSC server 310. The client receives (262) the current TSC that are available and stores (264) the TSC on the client device. If the user is currently streaming content, TSC from local TSC server 310 can be presented to the user as soon as possible.

Figure 4:
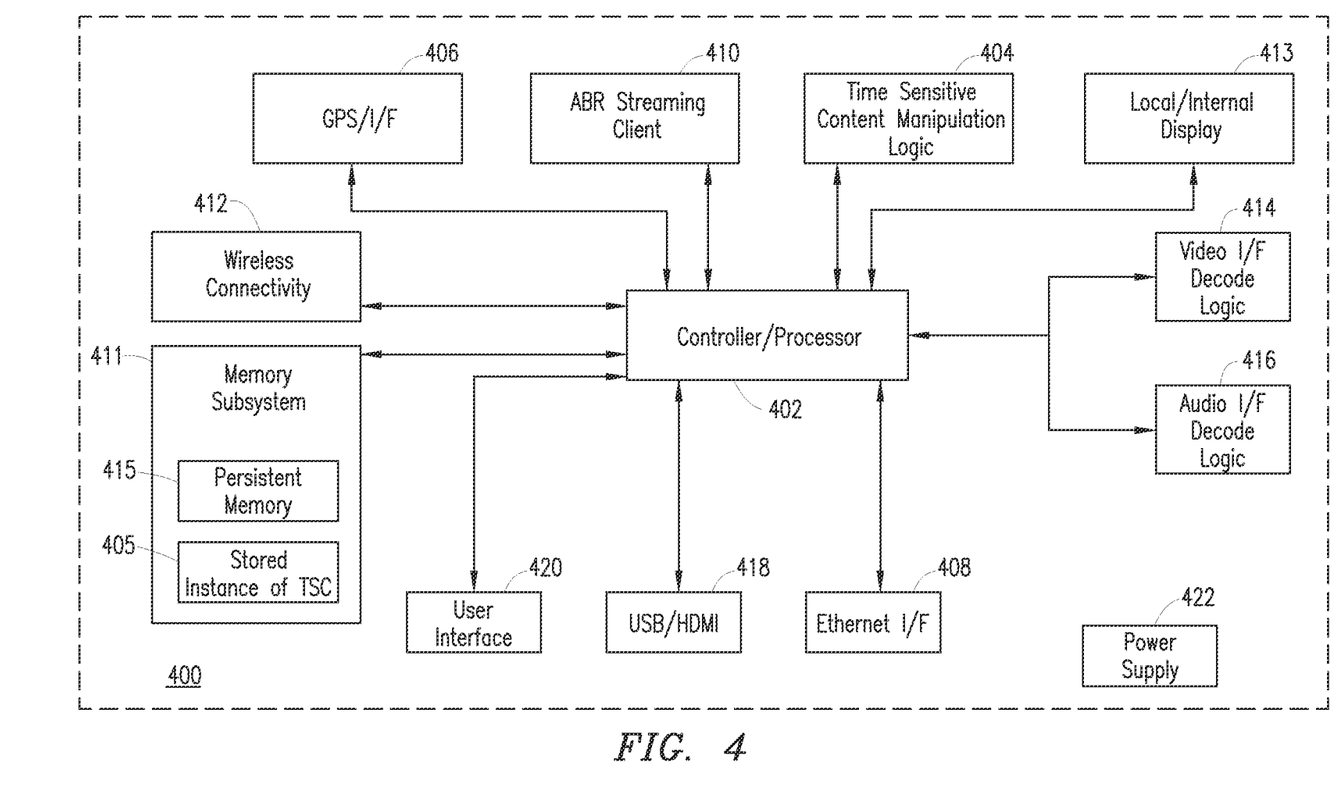
FIG. 4 depicts a block diagram showing an embodiment of a client device according to an embodiment of the present patent disclosure.

Referring now to FIG. 4, depicted therein is a block diagram of an example streaming client device 400 according to an embodiment of the present patent application. It should be appreciated that the streaming client device 400 is a UE device that is generally representative of the subscriber/client device 102 illustrated in FIG. 1. the hardware/software components and subsystems of device 400 may be configured for performing any of the device-side processes (either individually or in any combination thereof) described herein. A processor module 402 including one or more microcontrollers/processors is provided for the overall control of the client UE device 400 and for the execution of various stored program instructions embodied in a persistent memory 415 that may be part of a memory subsystem 411 of the device 400. Controller/processor complex referred to by reference numeral 402 may also be representative of other specialty processing modules such as graphic processors, video processors, digital signal processors (DSPs), and the like, operating in association with suitable video and audio interfaces 414, 416 for receiving/transmitting content data, which interfaces may include or operate in conjunction with appropriate tuners, demodulators, descramblers, MPEG decoders/demuxes. For example, the client device 400 may be configured to operate with a number of known audio formats (e.g., MP3, AAC, AAC+, eAAC+, FLAG WMA, WAV, AMR, OGG, DTS, AC3, LPCM and MIDI) as well as video formats such as, e.g., MPEG4, H.263, H.264, DivX, XviD, WMV, AVI, 3GO, Flash Video, etc. A location-based and/or satellite communications interface 406 may be provided in certain embodiments for effectuating satellite-based communications. Other I/O or interfaces may include one or more user interfaces 420 generally illustrative of a graphic user interface (GUI), touch-sensitive screen, keyboard, microphone, etc. Additionally, one or more USB/HDMI/DVI/FireWire ports 418 may be provided for effectuating connections to one or more external NV devices for purposes of the present patent disclosure. Additional external device connectivity may be achieved via interfaces such as Ethernet UF 408 as well as short-range and wide area wireless connectivity interfaces 412. In one implementation of the client device 400, a hard disk drive (HDD) system (not specifically shown) may be provided for mass storage of program assets such as A/V media, TV shows, movie titles, multimedia games, etc. Also included in the client/UE device 400 is a suitable power supply block 422, which may include AC/DC power conversion to provide power for the device 400. It should be appreciated that the actual power architecture for the client/UE device 400 may vary by the hardware platform used, e.g., depending upon the core SoC (System on Chip), memory, analog front-end, analog signal chain components and interfaces used in the specific platform, and the like.

For purposes of the present patent application, the stored program instructions embodied in the persistent memory 415 (e.g., Flash memory) of the client device 400 may include computer-readable instructions configured to perform one or more device-side processes, selectively in conjunction with other subsystems or logic blocks such as an ABR streaming client and decode logic 410 and time-sensitive content manipulation logic 404. As alluded to previously, an optional local or included display 413 may also be provided as part the client device 400 for rendering received content locally (for example, in a number of resolutions such as SD, ED or HD) in addition to operating as a touch-sensitive screen.

One skilled in the art will understand that a number of variations in the devices and methods shown may be used and are within the scope of the disclosed embodiments. Although the example disclosed in the present patent application utilizes ABR streaming, the disclosed method is not limited to use with ABR streaming technologies. Rather, it will be understood that the disclosed method can be used with any streaming technology that uses a buffer, e.g., progressive download or any other streaming technology, whether currently known or unknown. Further, although the present application generally downloads and stores replacement TSC on the client device, replacement TSC can also be downloaded in real-time in at least some embodiments, such as when the client is connected to a local TSC server during streaming of video. In the disclosed embodiments, segments of replacement TSC will generally have a duration that is the same as the segments of TSC being replaced. However as user devices become more powerful and greater broadband access becomes available, it is envisioned that this will no longer be a limitation on the process. The client in this embodiment is able to manipulate the video in the buffer to Applicants note that although time-sensitive content (TSC) is generally used in this application to denote elements such as advertising, public service announcement or alerts, etc., the ability to replace content in the buffer is not be limited to the replacement of outdated advertising or similar goals. In at least one embodiment, programming content can also be manipulated using the concepts of this disclosure. For example, a storyline can be provided with alternate endings or interactive branches that are presented only when specific conditions are met. The conditions can depend on time of day, location of the user, etc.

In the foregoing Detailed Description, functionalities of the various elements including components/blocks labeled or described as "module" or "process" or "processor" or "controller" or "computer" may be provided through the use of dedicated hardware as well as hardware capable of executing stored or preconfigured software. When provided by a processor, the functions may be provided by a single dedicated processor, by a single shared processor, or by a plurality of individual processors, some of which may be shared or distributed. Moreover, a "processor" or "controller" or "memory" may include, without limitation, digital signal processor (DSP) hardware, ASIC hardware, read only memory (ROM), random access memory (RAM), and/or other storage media.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method performed on a client device, comprising:
   streaming content from a streaming server via a buffer, the content comprising segments of requested content and segments of time-sensitive content (TSC);
   scanning metadata associated with the buffer to determine whether an instance of TSC in the buffer is optimal; and
   responsive to determining that a given instance of TSC in the buffer is not optimal, replacing the given instance of TSC with a replacement instance of TSC stored on the client device.

2. The method as recited in claim 1, further comprising:
   determining whether conditions associated with an instance of TSC stored on the client device have changed; and
   responsive to determining that the conditions associated with a first stored instance of TSC have changed, changing a priority associated with the first stored instance of TSC.

3. The method as recited in claim 2 further comprising:
   determining whether the first stored instance of TSC has expired or is no longer relevant; and
   responsive to determining that the first stored instance of TSC has expired or is no longer relevant, deleting the first stored instance of TSC from the client device.

4. The method as recited in claim 1 further comprising:
   determining whether to store the given instance of TSC on the client device; and
   responsive to determining to not store the given instance of TSC on the client device, discarding the given instance of TSC.

5. The method as recited in claim 1 further comprising when the client device starts up for the first time:
   checking with a TSC server for instances of TSC;
   downloading the instances of TSC; and
   storing the instances of TSC on the client device.

6. The method as recited in claim 5 further comprising sending a current state of the client device to the TSC server and responsive to the sending, receiving current instances of TSC and storing the current instances of TSC on the client device.

7. The method as recited in claim 1 further comprising:
   attaching to a local TSC server;
   receiving current instances of TSC from the local TSC server; and
   storing the current instances of TSC on the client device.

8. A client device comprising:
   a processor operably coupled to a memory subsystem and to an interface configured to receive streaming content;
   a streaming client configured to stream content from a remote server via a buffer; and time-sensitive content (TSC) manipulation logic configured to scan metadata associated with the buffer to determine whether an instance of TSC in the buffer is optimal and responsive to determining that a given instance of TSC in the buffer is not optimal, to replace the given instance of TSC with a replacement instance of TSC stored on the client device.

9. The client device as recited in claim 8 wherein the streaming client is an adaptive bit rate streaming client.

10. The client device as recited in claim 8 wherein the TSC manipulation logic is further configured to contact a network server for receiving TSC and to store the received TSC on the client device.

11. The client device as recited in claim 8 wherein the TSC manipulation logic is further configured to attach to a local server for receiving TSC and to store the received TSC on the client device.

12. A non-transitory computer-readable medium containing instructions stored thereon which, when executed by a client device operable to stream content, perform the acts:
   streaming content from a streaming server via a buffer, the content comprising segments of requested content and segments of time-sensitive content (TSC);
   scanning metadata associated with the buffer to determine whether an instance of TSC in the buffer is optimal; and
   responsive to determining that a given instance of TSC in the buffer is not optimal, replacing the given instance of TSC with a replacement instance of TSC stored on the client device.

13. The non-transitory computer-readable medium as recited in claim 12 wherein the instructions further perform the acts:
   determining whether conditions associated with an instance of TSC stored on the client device have changed; and
   responsive to determining that the conditions associated with a first stored instance of TSC have changed, changing a priority associated with the first stored instance of TSC.

14. The non-transitory computer-readable medium as recited in claim 13 wherein the instructions further comprise:
   determining whether the first stored instance of TSC has expired or is no longer relevant; and
   responsive to determining that the first stored instance of TSC has expired or is no longer relevant, deleting the first stored instance of TSC from the client device.

15. The non-transitory computer-readable medium as recited in claim 12 wherein the instructions further comprise:
   determining whether to store the given instance of TSC on the client device; and
   responsive to determining to not store the given instance of TSC on the client device, discarding the given instance of TSC.

16. The non-transitory computer-readable medium as recited in claim 12 wherein the instructions further comprise when the client device starts up for the first time:
   checking with a TSC server for instances of TSC;
   downloading the instances of TSC; and
   storing the instances of TSC on the client device.

17. The non-transitory computer-readable medium as recited in claim 16 wherein the instructions further comprise sending a current state of the client device to the TSC server and responsive to the sending, receiving current TSC and storing the current TSC on the client device.

18. The non-transitory computer-readable medium as recited in claim 12 wherein the instructions further comprise:
   attaching to a local TSC server;
   receiving current instances of TSC from the local TSC server; and
   storing the current instances of TSC on the client device.

* * * * *